United States Patent

[11] 3,627,101

[72] Inventor Stanley A. McClusky
  3001 Baylor Ave., Bakersfield, Calif. 93305
[21] Appl. No. 886,210
[22] Filed Dec. 18, 1969
[45] Patented Dec. 14, 1971

[54] CONVEYOR ARRANGEMENT FOR FEEDING ARTICLES IN DISCRETE AND BULK FASHION
  15 Claims, 3 Drawing Figs.
[52] U.S. Cl.................................................. 198/22, 177/53
[51] Int. Cl..................................................... B65g 47/56
[50] Field of Search.......................................... 198/34, 29, 31, 20, 22, 75, 185, 187; 177/53; 53/55; 214/301

[56] References Cited
UNITED STATES PATENTS
3,416,619 12/1968 McClusky .................. 177/53
3,420,353 1/1969 Babunovic..................... 198/22
1,718,812 6/1929 Doney........................... 198/187 X Primary Examiner—Evon C. Blunk
Assistant Examiner—Alfred N. Goodman
Attorney—Miketta, Glenny, Poms & Smith ABSTRACT: A conveyor arrangement for transporting, separating, and feeding to a receptacle in discrete and bulk fashion articles such as cantaloupe or other readily turnable articles of fruit or produce. The conveyor arrangement includes a first conveyor for transporting articles in one direction, a second conveyor along side said first conveyor and moving discrete articles separated from the articles on the first conveyor in the opposite direction, and a third conveyor for moving the remainder of said articles. Means to transfer articles from said first conveyor to the second conveyor includes a wall with spaced openings disposed between said first and second conveyors for turning an individual article into an opening to cause transfer of the article into a pocket or recess on the second conveyor.

Patented Dec. 14, 1971

3,627,101

INVENTOR.
STANLEY A. McCLUSKY
By
Miketta, Glenny, Poms & Smith
ATTORNEYS.

CONVEYOR ARRANGEMENT FOR FEEDING ARTICLES IN DISCRETE AND BULK FASHION

BACKGROUND OF INVENTION

In the filling of receptacles or boxes with fruit or produce, a minimum weight or number of such articles is often specified and required. It is very important that the minimum requirements be met but not greatly exceeded and therefore it is important that such boxes be filled to a precise weight or a precise number of articles. Various prior arrangements have been used for such accurate feeding of articles to boxes. Often this is accomplished by providing a two-stage filling operation, the first stage usually including the transfer of articles to the box in bulk to a selected weight slightly below the desired weight, and then moving the almost filled box to a second stage where one or more articles are discretely and separately transferred to a box to satisfy the precise weight or number selected.

Such a two-stage method and apparatus for filling a box is disclosed in my U.S. Pat. No. 3,416,619 wherein a dribble conveyor having an inwardly inclined portion selects and carries discrete potatoes from a potato collection zone which also feeds the bulk feed conveyor. The dribble conveyor also includes a downwardly inclined portion which delivers discrete articles to a box at the second filling stage to bring the box to precise weight or number of articles.

SUMMARY OF INVENTION

The present invention relates to a novel conveyor arrangement wherein a dribble conveyor is fed or supplied with articles from a first main article transport conveyor positively and rapidly so that a discrete article will always be ready to be delivered to a box at a final filling station. More particularly the invention relates to a novel dribble conveyor and means between the dribble conveyor and the main article transport conveyor for transferring discrete articles from the transport conveyor to the dribble conveyor in a very compact space saving conveyor arrangement. The invention also contemplates a conveyor arrangement which utilizes the rollable or turnable characteristics of certain fruit and produce such as cantaloupe and the like for assisting in the selection of discrete articles and their transfer to the dribble conveyor.

The primary object of the present invention therefore is to provide a novel conveyor arrangement for use in precise filling of boxes or receptacles.

An object of the invention is to provide a compact economical conveyor construction for rapid filling of boxes in a two-stage filling process.

Another object of the invention is to provide a conveyor arrangement wherein a first conveyor and an adjacent second conveyor are both inclined about their longitudinal axes to facilitate transfer of articles from the first conveyor to the second conveyor.

A further object of the invention is to provide such an arrangement of the first and second conveyors together with means provided between said conveyors having a surface adapted to be contacted by articles on the first conveyor for causing said articles to turn in a direction which will facilitate their movement through an opening in said surface for transfer to the second conveyor.

A still further object of the invention is to disclose and provide a dribble type conveyor carrying means along one edge of the conveyor for transfer of articles from an adjacent conveyor to the dribble conveyor.

A still further object of the invention is to provide a dribble conveyor having relatively widely spaced article receiving recesses, the space between said recesses being provided with a wall at one edge of the conveyor.

Generally speaking the invention contemplates a conveyor arrangement wherein a first conveyor transports presized articles in one direction, a second conveyor moving in the opposite direction is placed along side one edge of the first conveyor, means are provided between said adjacent first and second conveyors at their adjacent edges for imparting a turning motion to articles in contact therewith, the latter means having openings leading to article receiving recesses in said second conveyor whereby the articles will be turned into said recesses and wherein the remainder of said articles on said first conveyor are transported to a third conveyor for movement of articles into a box at a first bulk feeding station, the second conveyor supplying discrete articles one at a time to a second final filling station.

Various other objects and advantages of the present invention will be readily apparent from the following description of the drawings in which an exemplary embodiment of the invention is shown.

Figure 1:
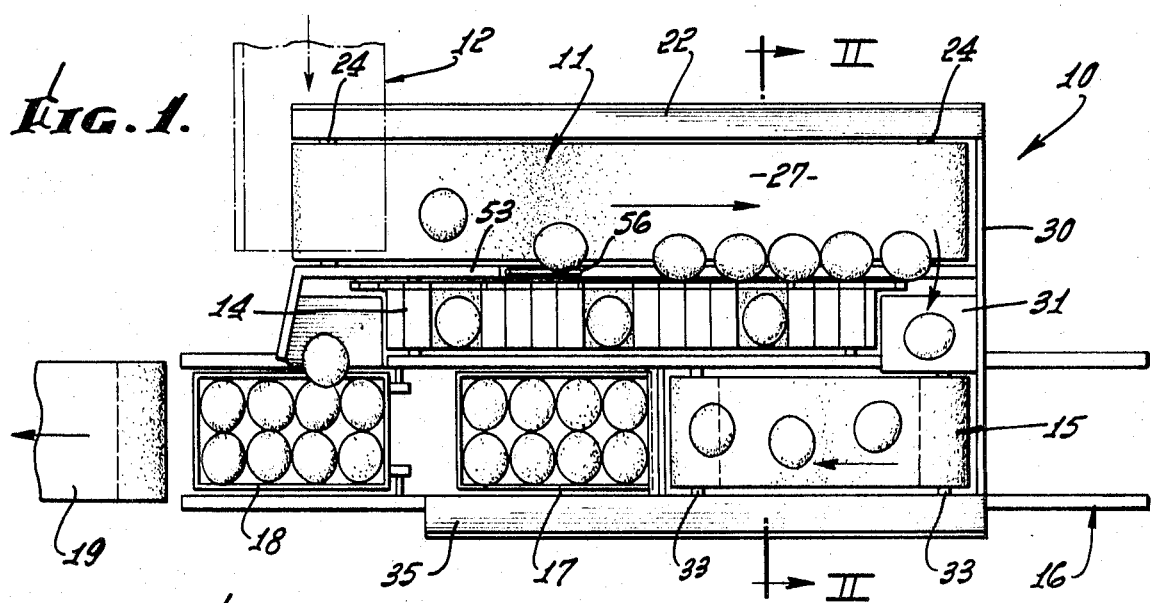
FIG. 1 is a generally schematic plan view of a conveyor arrangement embodying this invention.

In FIG. 1 a conveyor arrangement or assembly embodying this invention is generally indicated at 10 and comprises a first conveyor means 11 adapted to receive at one end thereof articles such as sized cantaloupe from a conveyor 12, indicated in phantom lines, transporting said cantaloupe from a sizer or other equipment to the first conveyor means 11. Alongside first conveyor means 11 is a second or dribble conveyor means 14 and alongside the second conveyor means is a main or bulk feeding conveyor means 15. A box conveyor is generally indicated at 16 for moving boxes beneath the third conveyor means 15 to a first box filling station indicated by box 17. A second box filling station indicated at box 18, said boxes being moved by said box conveyor 16 to said stations and thence onto a discharge conveyor 19.

The operation of dribble conveyor 14, bulk feed conveyor 15, box conveyor 16 and the filling of the boxes 17 and 18 is accomplished in the manner as described in my U.S. Pat. No. 3,416,619 issued Dec. 17, 1968. In the operation of the apparatus in accordance with my U.S. Pat. No. 3,416,619 which is incorporated by reference herein, the box conveyor 16 moves an empty box to the position shown by box 17 where it is bulk fed rapidly by bulk feed conveyor means 15. At a selected weight determined by a scale beneath box 17, conveyor means 15 is stopped. Box 18 which was formerly in the position of box 17 and, therefore, filled to just below a selected weight is also positioned on a scale and upon reaching the second station at box 18 the dribble conveyor 14 independently feeds discrete articles to said box until the weight requirement is satisfied at which time the dribble conveyor means 14 is stopped. When the selected weight condition in both boxes 17 and 18 are satisfied, box conveyor 16 is actuated to advance boxes 17 and 18, box 18 advancing onto the discharge conveyor 19 and box 17 advancing to the second filling station formally occupied by box 18. With this brief explanation of the operation of a box filling apparatus as schematically shown in FIG. 1, the conveyor arrangement of the present invention will now be described.

As generally described above, first conveyor means 11 receives sized articles from conveyor 12 and transports such articles in one direction away from conveyor 12. Conveyor means 11 may be supported from longitudinally extending parallel frame members 22 and 23 and includes end drums 24 of selected diameter and supporting thereon an endless flexible belt 26 made of suitable belt material. The top lay 27 of said belt may be supported in a plane by a longitudinal flat plate 28 secured to frame members 22, 23 in a suitable manner. Plate 28 and the belt 27 may be inclined about the longitudinal axis of conveyor means 11 so that articles carried thereby will tend to move to the right side of said belt. The angle of inclination of the top lay 27 may be, for example, about 8° to the horizontal, it being understood that such angle may be varied depending upon the characteristics of the articles being transported. The first conveyor means 11 may be driven by a suitable drive means such as described in my U.S. Pat. No. 3,416,619.

At the discharge end of the first conveyor means 11, an end wall 30 diverts the articles laterally onto an inclined apron 31 which directs the articles onto the adjacent feed end of the third conveyor means 15.

The third conveyor means 15 may comprise end drums 33 having their axes horizontally disposed and supported in suitable manner from frame members 34 and 35. Third conveyor means 15 includes an endless belt 36 of flexible, suitable belt material having an upper lay 37 supported in a horizontal plane by a suitable longitudinally extending plate 38 secured to frame members 34, 35 in suitable manner. The top lay 37 and supporting plate 38 may be horizontal.

The third conveyor means 15 may be driven in a manner corresponding to the bulk feed conveyor described in my U.S. Pat. No. 3,416,619 and as briefly described hereinabove. Conveyor means 15 rapidly delivers articles in bulk fashion to the first filling station indicated by the position of box 17, FIG. 1.

Figure 3:
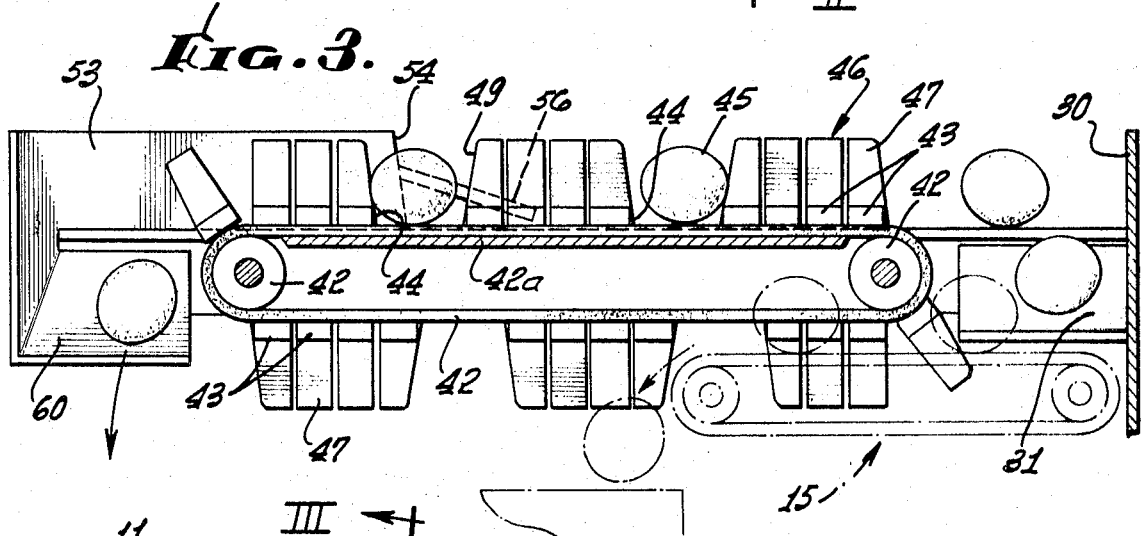
FIG. 3 is a longitudinal sectional view taken in the slightly inclined plane indicated by line III—III of FIG. 2.

In this invention, the second or dribble conveyor means 14 comprises end rollers 40 having their axes disposed in a plane parallel to the inclined plane of the top lay 27 of belt means 26. The rollers 40 are suitably rotatably mounted in frames 23 and 34. The second conveyor means 14 includes an endless flexible belt 42 having a top lay supported in an inclined plane of about 8° slightly below lay 27 by a plate 42a secured to frame member 34. Belt 42 carries a plurality of transversely arranged closely adjacent blocks or bridges 43. Each block 43 may be secured to the belt 42 along the longitudinal axis of block 43 so that each block 43 may be readily carried around drums 42 as illustrated in FIG. 3. In this example, blocks 43 are arranged in groups of four closely adjacent mounted blocks, each group being spaced apart a distance so as to form an article receiving recess 44 of approximately the size of the article to be received. In this example, recess 44 has a width and length approximately that of a cantaloupe 45.

Means for transferring single cantaloupe from the first conveyor means 11 to the second conveyor means 14, each into a recess 44, may comprise a longitudinally extending wall means 46 disposed between the first conveyor means 11 and the second conveyor means 14 and extending longitudinally between the adjacent side edges of said conveyors. In this example, wall means 46 may comprise upstanding wall segments 47 each secured by suitable means to an end face 48 of a block 43. Each wall segment has a width approximately that of the width of block 43. Wall segments 47 carried by blocks 43 of a group of blocks define an opening 49 in the wall means 46 through which a cantaloupe 45 may pass for reception in the recess 44. Each group of wall segments 47 provide a longitudinally extending surface 50 adapted to be contacted as at 51 by a cantaloupe on the first conveyor means 11. It will be noted that because of the inclination of the first conveyor means 11 cantaloupe discharged thereon from conveyor 12 will tend to move toward the lower longitudinal edge of the conveyor means 11. To control movement of the cantaloupe along the longitudinal edge the frame means supporting the several conveyor means may be provided with an upstanding longitudinally extending wall 53 which extends along and covers the discharge end portion of the second conveyor means 14. Between the rearwardly directed edge 54 of wall 53 and the end wall 30 of the frame, a space is provided along which cantaloupe are permitted to engage surfaces 50 of the several groups of wall means 56 as they are moved in a direction opposite to the conveyor means 11. Thus as the cantaloupe engage surface 50 in this space, they are rotated or turned in a clockwise direction by the countermovement of the belt 27 of the conveyor means 11 and the movement in the opposite direction of the second conveyor means and the wall means 46. Thus as a cantaloupe reaches opening 49, its turning movement causes it to turn into the opening and to be transferred onto the second conveyor means 14.

In this example since cantaloupe are relatively large and the boxes 17 and 18 can be filled to precise weight by the addition of one cantaloupe, the dribble conveyor 14 can be adequately supplied with cantaloupe on its upper lay by providing one opening operative to receive a cantaloupe.

Means to prevent jamming of a cantaloupe 45 between the edge 54 of stationary wall 53 and the leading moving edge of wall means 46 may include a suitable rod or barrier 56 secured to wall 53 and extending a sufficient distance in the direction of travel of the conveyor means 11 so as to bridge an opening 49 and to thereby prevent the cantaloupe from being jammed between the stationary wall and the moving wall.

Figure 2:
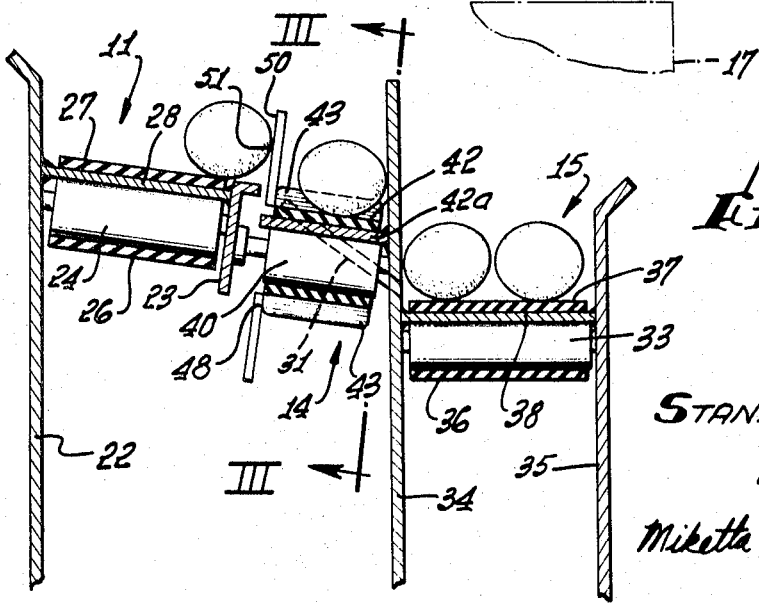
FIG. 2 is a vertical transverse fragmentary sectional view taken in the plane indicated by line II—II of FIG. 1.

Cantaloupe 45 which are turned into an opening 49 will quickly move to the far side of article receiving recess 44 defined by the blocks 43 because of the inclination of the top lay of the endless belt 42 of the conveyor means 14. As best shown in FIG. 2 the inclination of the top lay of the second conveyor means 14 is approximately 8° and is approximately parallel to the top lay 27 of the conveyor means 11. Thus, cantaloupe received in recesses 44 will be transported by the second conveyor means and may slide along the adjacent surface of frame member 34 until the end of the conveyor means whereupon they will be discharged onto a downwardly and sidewardly inclined apron 60 which directs the cantaloupe into the box 18.

As single cantaloupe are deposited in box 18, the weight requirement of the box will be rapidly and precisely met whereupon in accordance with the method of operation described in my aforesaid U.S. Pat. No. 3,416,619 both boxes 17 and 18 will be advanced by the box conveyor 16. Satisfaction of the weight requirement at both of the stations at which boxes 17 and 18 are positioned causes the second and third conveyor means 14 and 15 to stop so that as the boxes are advanced by the box conveyor 16 articles will not be discharged from such conveyors. It will be understood, of course, that the main transport first conveyor means 11 may continue to feed articles to the feed end of the third conveyor means 15 so that upon commencement of the filling operation of the next boxes a bulk quantity of articles will be available on the third conveyor means 15.

It will be readily apparent that the spacing between the groups of blocks on the dribble second conveyor means 14 may be readily varied according to the size of the article by adding or subtracting blocks 43 each with a wall segment 47. In this example, the recess 44 has a width approximately that of the cantaloupe. In the event smaller articles are to be fed to such a dribble conveyor, a partial insert may be placed on the low side of the recess 44 so that an article received within the partially occupied recess will still serve to turn away a second article and thus assure that only one article is carried in recess 44.

Surface 50 on the wall means 46 may be a smooth metal or wood surface and may be matte finished or provided with a suitable coating to provide enhanced or greater frictional engagement between surface 50 and an article. Some articles having a different weight and size as compared to the exemplary cantaloupe may be imparted sufficient turning movement to positively turn the article into the opening in wall 46 when wall 46 is stationary and interposed between the longitudinal adjacent edges of the first and second conveyor means. Turning movement of such an article is also dependent upon the speed of advancement of the first conveyor means. In the present example, the countermovement of the surface of belt 27 of the first conveyor means and the wall surface 50 of the second conveyor means positively imparts a turning movement to the cantaloupe which is caused to quickly dart and turn into the opening 49 and recess 44.

It will be understood that the rod barrier 56 which is inclined downwardly toward the direction of movement of the second conveyor means provides an inclined surface against which an article partially received within opening 44 will contact and depending upon the location of the center of the article with respect to the rod 56, the rod 56 will turn the article either into or out of opening 44. Thus, articles are prevented from being carried in the direction of movement of the second conveyor means for impingement against edge 54 of the fixed wall 53.

Depending upon the size and the configuration of the article to be processed the inclination of the first and second conveyor means may be varied from the exemplary 8° described above. When sized articles are filling boxes 17 and 18 and the articles are of approximately the same density, it will be readily understood that the aggregate weight of each box as measured by the scale will correspond to and be representative of the numerical count of the articles.

While the conveyor arrangement of this invention has been described with respect to a two stage box filling system of my U.S. Pat. No. 3,416,619, it will be understood that the arrangement of the first and second conveyor means may be employed in other conveyor systems where discrete articles are desired to be separated from a main stream of articles. Changes and modifications may be made within the spirit of the present invention.

I claim:

1. In a conveyor arrangement for feeding discrete turnable articles such as cantaloupe or the like to a receptacle, such as a box, the combination comprising:
   a first conveyor means for moving a plurality of such articles in one direction;
   a second conveyor means for moving individual articles in the opposite direction independently of said first conveyor means;
   and means for transferring single articles from the first conveyor means to the second conveyor means including
   means operably positioned between said first and second conveyor means for imparting a sideways turning movement to such an article while being advanced on the first conveyor means, after which said sideways turning movement moves the article from the first to the second conveyor means without further engagement with the means operably positioned between the first and second conveyor means.

2. A conveyor arrangement as stated in claim 1 wherein said first conveyor means is tilted about its longitudinal axis to urge articles against said means between said first and second conveyor means.

3. A conveyor arrangement as stated in claim 1 wherein said second conveyor means is tilted about its longitudinal axis to position an article on said second conveyor means.

4. In a conveyor arrangement for feeding discrete turnable articles such as cantaloupe or the like to a receptacle, such as a box, the combination comprising:
   a first conveyor means for moving a plurality of such articles in one direction;
   a second conveyor means for moving individual articles in the opposite direction independently of said first conveyor means;
   and means for transferring single articles from the first conveyor means to the second conveyor means including
   means operably positioned between said first and second conveyor means for imparting turning movement to such an article advanced on the first conveyor means to direct and turn such article on to said second conveyor means;
   said means between said first and second conveyor means includes a longitudinal wall on said second conveyor means and moving relative to said first conveyor means;
   said longitudinal wall being provided with spaced openings for admitting and passing an article from said first conveyor means to said second conveyor means.

5. A conveyor arrangement as stated in claim 4 wherein said longitudinal wall is segmented.

6. A conveyor arrangement as stated in claim 5 wherein said second conveyor means includes article receiving recesses opposite said openings in said longitudinal wall.

7. In a conveyor arrangement as stated in claim 6 wherein said recesses are spaced apart longitudinally a distance greater than the diameter of an article.

8. In combination a conveyor assembly for feeding articles to a receptacle in at least two stages, comprising:
   a first conveyor means for transporting a plurality of randomly located articles in one direction;
   a second conveyor means for transporting individual articles separated from said plurality of articles on said first conveyor means in the opposite direction independently of said first conveyor means;
   a third conveyor means for transporting the remainder of said articles conveyed by said first conveyor means;
   means for transferring articles from said first conveyor means to said second and third conveyor means and including
   means extending longitudinally between said first and second conveyor means and provided with spaced openings therein,
   said longitudinally extending means having a surface for contact with articles on said first conveyor means for turning said articles into said openings;
   said third conveyor means extending alongside and moving in the same direction as said second conveyor means;
   inclined means connecting said first conveyor means and said third conveyor means for transfer of the remainder of said articles to said third conveyor means;
   said first and second conveyor means being inclined about their longitudinal axis.

9. In the combination as stated in claim 8 wherein said means extending longitudinally between said first and second conveyor means includes
   an upstanding side wall carried by and movable with said second conveyor means.

10. A conveyor structure for receiving articles at the side thereof and intermediate ends thereof and in spaced relation comprising:
    an endless belt means including means defining article receiving recesses in spaced relation on said belt means;
    means at one side edge of said belt means defining openings to said article recesses;
    said means defining said openings including
    a surface adapted to contact an article to impart turning motion thereof for turning an article into said opening and into said recess.

11. 11. A conveyor structure as stated in claim 10 wherein said surface is on an upstanding wall means carried by and movable with said belt means.

12. A conveyor structure as stated in claim 11 wherein said upstanding wall means includes a plurality of wall segments.

13. A conveyor structure as stated in claim 10 including means adjacent said one side edge of said belt means for moving articles in a direction opposite to that of the endless belt means.

14. The conveyor structure as in claim 10 wherein the endless belt means is tilted to hold the articles in said article recesses once the articles are turned into said recesses.

15. The conveyor structure as in claim 10 additionally comprising a second endless belt means for supplying articles and located besides the first mentioned endless belt means, with the means defining said openings located therebetween, said second endless belt means being inclined towards the means defining said openings for directing articles against the surface of the means defining the openings.

* * * * *